US011558769B2

(12) United States Patent
Sawabe et al.

(10) Patent No.: US 11,558,769 B2
(45) Date of Patent: Jan. 17, 2023

(54) ESTIMATING APPARATUS, SYSTEM, METHOD, AND COMPUTER-READABLE MEDIUM, AND LEARNING APPARATUS, METHOD, AND COMPUTER-READABLE MEDIUM

(71) Applicant: NEC Corporation, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/282,835

(22) PCT Filed: Sep. 5, 2019

(86) PCT No.: PCT/JP2019/035041
§ 371 (c)(1),
(2) Date: Apr. 5, 2021

(87) PCT Pub. No.: WO2020/079986
PCT Pub. Date: Apr. 23, 2020

(65) Prior Publication Data
US 2021/0352516 A1    Nov. 11, 2021

(30) Foreign Application Priority Data
Oct. 15, 2018    (JP) .............................. JP2018-194254

(51) Int. Cl.
*H04W 28/02*    (2009.01)
*H04W 28/08*    (2009.01)
*H04W 28/10*    (2009.01)

(52) U.S. Cl.
CPC ... *H04W 28/0231* (2013.01); *H04W 28/0958* (2020.05); *H04W 28/10* (2013.01)

(58) Field of Classification Search
CPC ......... H04W 28/0231; H04W 28/0958; H04W 28/10; H04L 67/61
See application file for complete search history.

(56) References Cited

U.S. PATENT DOCUMENTS

| | | | | |
|---|---|---|---|---|
| 2012/0106798 | A1* | 5/2012 | Monden | G06K 9/00523 382/103 |
| 2013/0254143 | A1* | 9/2013 | Ueki | G06V 40/172 706/15 |
| 2017/0339573 | A1* | 11/2017 | Yamada | H04W 24/08 |

FOREIGN PATENT DOCUMENTS

| | | |
|---|---|---|
| JP | 2011-015253 A | 1/2011 |
| JP | 2015-050473 A | 3/2015 |

(Continued)

OTHER PUBLICATIONS

International Search Report for PCT Application No. PCT/JP2019/035041, dated Nov. 26, 2019.

*Primary Examiner* — Jung H Park

(57) ABSTRACT

An estimating apparatus (1) according to the present invention includes a plurality of feature quantity calculating units (111 to 11n) configured to implement processing of calculating, from a communication traffic, a differing feature quantity group for each of a plurality of types of control attributes relating to communication control, the plurality of feature quantity calculating units being each associated with each of the plurality of types of control attributes, a calculating unit (12) configured to calculate, with regard to each of two or more of the plurality of types of control attributes, each of the feature quantity groups from the communication traffic by use of the feature quantity calculating unit being associated with each of the control attributes, and an estimating unit (13) configured to estimate an attribute value of each of the two or more control attributes from each of the calculated feature quantity groups.

13 Claims, 11 Drawing Sheets

(56) References Cited

FOREIGN PATENT DOCUMENTS

JP  6153166 B2  6/2017
JP  2017-139580 A  8/2017

* cited by examiner

ESTIMATING APPARATUS, SYSTEM, METHOD, AND COMPUTER-READABLE MEDIUM, AND LEARNING APPARATUS, METHOD, AND COMPUTER-READABLE MEDIUM

This application is a National Stage Entry of PCT/JP2019/035041 filed on Sep. 5, 2019, which claims priority from Japanese Patent Application 2018-194254 filed on Oct. 15, 2018, the contents of all of which are incorporated herein by reference, in their entirety.

TECHNICAL FIELD

The present invention relates to an estimating apparatus, system, method, and program, and a learning apparatus, method, and program, and particularly relates to an estimating apparatus, system, method, and program for estimating a control attribute relating to communication control from a communication traffic, and a learning apparatus, method, and program.

BACKGROUND ART

In recent years, development of an information service by remote control via a network has been advanced. In other words, along with spread of Internet of Things (IoT) connecting a wide variety of devices (things) to a network, advancement of an information service by remote control or a cooperative operation via a network is expected in various fields. Particularly, usage needs for a wireless network such as a cellular network are increasing.

A communication traffic flowing in a network is diversified along with spread of IoT. Therefore, a change has arisen in needs of a communication user. Specifically, needs of a communication user have changed initially to being able to perform communication as such, then to being able to perform communication while moving, and now to being able to perform communication relevant to an application-unit requirement. From now on, it is anticipated that being able to perform communication relevant to an ever-changing usage status of an application is requested. Thus, it is considered that a performance index (e.g., key performance indicator (KPI)) of a telecommunications carrier shifts from traditional communication-level quality of service (QoS) to application-level quality of service (hereinafter, referred to as "application quality"). In other words, it is assumed that, from now on, a telecommunications carrier regards, as important, network control or network designing based on application quality.

Herein, for application quality, for example, application quality of a person (quality of experience (QoE)) and application quality of a thing (quality of control (QoC)) can be cited. For example, for application quality relating to application quality of a person, QoE of Web access (ITU-T Recommendation G.1030), Web-browsing, and video distribution (ITU-T P.1203) is defined in International Telecommunication Union Telecommunication Standardization Sector (ITU-T). It is assumed that, for application quality relating to application quality of a thing, discussion of a performance index (quality of performance (QoP) or QoC) for machine control across a network is advanced.

It is considered that, along with such advancement of needs of a communication user for communication quality, provision or the like of a communication service relevant to an application-unit requirement or a communication service relevant to an ever-changing usage status of an application is required from a telecommunications carrier from now on. Thus, knowing a state change of an application becomes an issue for a telecommunications carrier.

In order that a telecommunications carrier provides "optimum communication quality according to an ever-changing usage condition (a state of an application) and enhances a degree of satisfaction (QoE) of a communication user, precise communication control is needed. For example, an increase of a control target parameter (a communication band, fluctuation of transmission delay (jitter or the like), and the like), shortening of a control cycle, and the like can be cited.

However, in recent years, limitation of information that a telecommunications carrier (network equipment or the like provided by the telecommunications carrier) can acquire from an observable communication traffic has become great due to multiplexing of a communication traffic for communication speedup, encryption of a communication traffic for security enhancement, and the like.

Thus, it has become difficult for a telecommunications carrier to know a type or a state change of an application from a communication traffic, and precise communication control of communication equipment relevant to a usage status of an application has become difficult.

Herein, Patent Literature 1 discloses a technique relating to a traffic monitoring device that monitors a traffic of network communication, and estimates a type of a communication application related to a flow of a monitoring target. The traffic monitoring device first calculates a feature quantity from a packet from a head of a flow of a communication traffic of a monitoring target to a predetermined number. Further, the traffic monitoring device predicts a feature quantity of a packet at and after the predetermined number from the calculated feature quantity, and produces a set of feature quantities of the monitoring target including the calculated feature quantity and the predicted feature quantity. Thereafter, the traffic monitoring device collates a plurality of types of sets of feature quantities previously registered for each communication application with the set of feature quantities of the monitoring target, and estimates a type of a communication application being appropriate to the flow of the monitoring target.

CITATION LIST

Non Patent Literature

[Patent Literature 1] Japanese Patent No. 6153166

SUMMARY OF INVENTION

Technical Problem

However, since a head packet of a flow is necessary for a packet being an analysis target, and a type of a feature quantity of a collation target is fixed, Patent Literature 1 has a problem that a diversified analysis may not be performed, and accuracy of estimating a control attribute for communication control relevant to a usage status of an application is low.

The present disclosure has been made in order to solve such a problem, and is intended to provide an estimating apparatus, system, method, and program, and a learning apparatus, method, and program, for improving accuracy of estimating, from a communication traffic related to usage of an application, a plurality of types of control attributes relating to communication control relevant to a usage status of the application.

Solution to Problem

An estimating apparatus according to a first aspect of the present disclosure includes:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a calculating unit configured to calculate, with regard to each of two or more of the plurality of types of control attributes, each of the feature quantity groups from the communication traffic by use of the feature quantity calculating unit being associated with each of the control attributes; and an estimating unit configured to estimate an attribute value of each of the two or more control attributes from each of the calculated feature quantity groups.

An estimating system according to a second aspect of the present disclosure includes:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a storing unit configured to store a plurality of estimating models which are each associated with each of the plurality of types of control attributes and with which an attribute value of each of the associated control attributes is estimated from the associated feature quantity group, and a correct answer of the attribute value in each of the plurality of types of control attributes;

a first calculating unit configured to calculate, by each of the plurality of feature quantity calculating units, each of the feature quantity groups calculated from the communication traffic of a learning target;

a learning unit configured to learn a parameter of each of the plurality of estimating models by use of each of the calculated feature quantity groups and a correct answer of the attribute value in a control attribute being associated with each of the feature quantity groups, and store the learned estimating model in the storing unit;

a second calculating unit configured to calculate, by use of the feature quantity calculating unit being associated with each control attribute, each of the feature quantity groups from the communication traffic of an estimating target, with regard to each of two or more of the plurality of types of control attributes; and an estimating unit configured to estimate an attribute value of each of the two or more control attributes from each of the calculated feature quantity groups.

An estimating method according to a third aspect of the present disclosure includes:

by a computer, calculating, by use of two or more, being each associated with each control attribute, of a plurality of feature quantity calculating modules configured to implement processing of calculating a differing feature quantity group for each of a plurality of types of control attributes relating to communication control, each of feature quantity groups for each of the control attributes, from a communication traffic; and estimating an attribute value of each of the two or more control attributes from each of the calculated feature quantity groups.

An estimating program according to a fourth aspect of the present disclosure causes a computer to execute:

processing of calculating, by use of two or more, being each associated with each control attribute, of a plurality of feature quantity calculating modules configured to implement processing of calculating a differing feature quantity group for each of a plurality of types of control attributes relating to communication control, each of feature quantity groups for each of the control attributes, from a communication traffic; and processing of estimating an attribute value of each of the two or more control attributes from each of the calculated feature quantity groups.

A learning apparatus according to a fifth aspect of the present disclosure includes:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a storing unit configured to store a plurality of estimating models which are each associated with each of the plurality of types of control attributes and with which an attribute value of each of the associated control attributes is estimated from the associated feature quantity group, and a correct answer of the attribute value in each of the plurality of types of control attributes;

a calculating unit configured to calculate, by use of each of the plurality of feature quantity calculating units, each of the feature quantity groups from the communication traffic; and a learning unit configured to learn a parameter of each of the plurality of estimating models by use of each of the calculated feature quantity groups and a correct answer of the attribute value in a control attribute being associated with each of the feature quantity groups, and store the learned estimating model in the storing unit.

A learning method according to a sixth aspect of the present disclosure includes:

by a computer, calculating, by use of each of a plurality of feature quantity calculating modules configured to implement processing of calculating a differing feature quantity group for each of a plurality of types of control attributes relating to communication control, each of feature quantity groups for each of the control attributes, from a communication traffic;

learning, by use of each of the calculated feature quantity groups and a correct answer of an attribute value in a control attribute being associated with each of the feature quantity groups, a parameter of each of a plurality of estimating models which are each associated with each of the plurality of types of control attributes and with which an attribute value of each of the associated control attributes is estimated from the associated feature quantity group; and storing the learned estimating model in a storing device.

A learning program according to a seventh aspect of the present disclosure causes a computer to execute:

processing of calculating, by use of each of a plurality of feature quantity calculating modules configured to implement processing of calculating a differing feature quantity group for each of a plurality of types of control attributes relating to communication control, each of feature quantity groups for each of the control attributes, from a communication traffic;

processing of learning, by use of each of the calculated feature quantity groups and a correct answer of an attribute value in a control attribute being associated with each of the feature quantity groups, a parameter of each of a plurality of estimating models which are each associated with each of the plurality of types of control attributes and with which an attribute value of each of the associated control attributes is estimated from the associated feature quantity group; and processing of storing the learned estimating model in a storing device.

Advantageous Effects of Invention

The present disclosure is able to provide an estimating apparatus, system, method, and program, and a learning apparatus, method, and program, for improving accuracy of estimating, from a communication traffic related to usage of an application, a plurality of types of control attributes relating to communication control relevant to a usage status of the application.

DESCRIPTION OF EMBODIMENTS

Hereinafter, example embodiments of the present disclosure will be described in detail with reference to the drawings. In each drawing, the same reference sign is given to the same or associated element, and, for clarification of description, repeated description is omitted as required.

Herein, another aspect of a problem to be solved by the example embodiments of the present disclosure is complemented. For example, in recent years, since constant encryption of a communication traffic has been advanced, an encrypted traffic flowing in a network has been increasing. Moreover, traffics are also diversified. Thus, a method of Deep Packet Inspection (DPI) that looks into contents of a traffic has a limit. There is also a possibility that DPI itself becomes unusable from the viewpoint of Personal Information Protection Law. In other words, it is difficult for a telecommunications carrier to see contents of communication data from the viewpoint of encryption or privacy.

Furthermore, information that a telecommunications carrier can acquire from a communication traffic includes a "5-tuple" that can be read from a header of a single packet, and a traffic pattern that is derivable from a plurality of packets. Herein, the "5-tuple" is, for example, an Internet Protocol (IP) address of a transmission source, a port of the transmission source, an IP address of a destination, a port of the destination, and a protocol. The traffic pattern includes, for example, a throughput, a packet size, a packet transmission interval, and the like. A traffic flow is constituted of a group of packets having the same information within an IP header field (a cluster of packets in which a destination IP address and a port number, or a transmission source IP address and a port number are equal).

However, in recent years, multiplexing of a communication traffic has been advanced for speedup of communication, and, therefore, even with the same "5-tuple", pieces of information of a plurality of applications can be mixed. Thus, it is difficult for a telecommunications carrier to separate an application from a communication traffic. Accordingly, it is difficult for network equipment provided by the telecommunications carrier to acquire what application a communication user (e.g. a terminal) uses or in what state the application operates. Therefore, communication control relevant to a usage form or a usage state of the application becomes difficult.

First Example Embodiment

Figure 1:
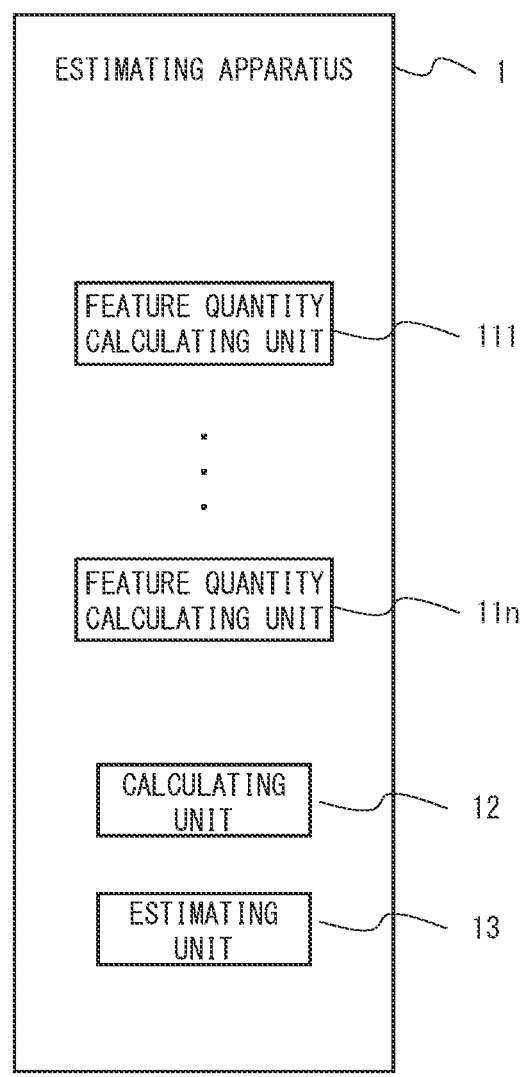
FIG. 1 is a block diagram illustrating a configuration of an estimating apparatus according to a first example embodiment.

FIG. 1 is a block diagram illustrating a configuration of an estimating apparatus 1 according to a first example embodiment. The estimating apparatus 1 is an information processing apparatus for analyzing a communication traffic observed in a communication apparatus on a network, and estimating a control attribute relating to communication control of the communication apparatus relevant to a usage status of an application or the like used in the communication.

The estimating apparatus 1 includes feature quantity calculating units 111 to 11n (n is a natural number equal to or more than 2), a calculating unit 12, and an estimating unit 13. Each of the feature quantity calculating units 111 to 11n is a functional block that implements processing of calculating, from a communication traffic, a differing feature quantity group for each of a plurality of types of control attributes relating to communication control. Thus, the feature quantity calculating units 111 and the like may be implemented by any one of hardware or software or both hardware and software. Each of the feature quantity calculating units 111 to 11n is associated with each of the plurality of types of control attributes. Herein, a control attribute is a parameter or the like used for communication control of the communication apparatus described above. For example, the control attribute includes a classification of an application, identification information of a providing source of the application, a classification of contents, quality information, and other information. Thus, for example, the feature quantity calculating unit 111 calculates, by a first calculating logic, a first feature quantity group that is a cluster of feature quantities being associated with a first control attribute. Similarly, the feature quantity calculating unit 11n calculates, by an n-th calculating logic, an n-th feature quantity group that is a cluster of feature quantities being associated with an n-th control attribute. Each of the first to n-th feature quantity groups differs in at least a part of the cluster of feature quantities. The first to n-th calculating logics also differ in at least a part of processing.

The calculating unit 12 calculates each of feature quantity groups from the communication traffic with regard to two or more of a plurality of types of control attributes, by use of the feature quantity calculating units 111 and the like being each associated with each control attribute. For example, the calculating unit 12 calculates a first feature quantity group from a communication traffic by use of the feature quantity calculating unit 111 being associated with the first control attribute, and calculates a second feature quantity group from a communication traffic by use of the feature quantity calculating unit 112 being associated with a second control attribute. In other words, the calculating unit 12 calculates each feature quantity group by use of at least two or more of the feature quantity calculating units 111 to 11n.

The estimating unit 13 estimates an attribute value of each of the two or more control attributes from each of the feature quantity group calculated by the calculating unit 12. For example, the estimating unit 13 may estimate an attribute value by use of an estimating logic relevant to each control attribute. For example, the estimating unit 13 inputs the first feature quantity group and estimates a first attribute value in the first control attribute by use of a first estimating logic being associated with the first control attribute. Moreover, the estimating unit 13 inputs the second feature quantity group and estimates a second attribute value in the second control attribute by use of a second estimating logic being associated with the second control attribute.

Figure 2:
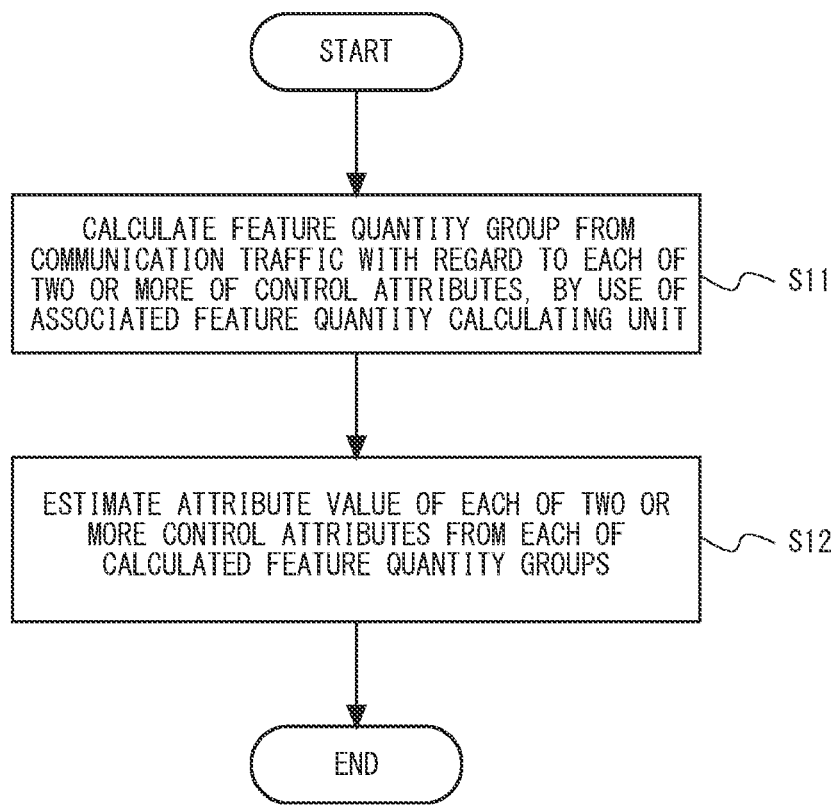
FIG. 2 is a flowchart illustrating a flow of an estimating method according to the first example embodiment.

FIG. 2 is a flowchart illustrating a flow of an estimating method according to the first example embodiment. First, the calculating unit 12 calculates each of feature quantity groups from a communication traffic with regard to two or more of a plurality of control attributes, by use of the feature quantity calculating units 111 and the like being each associated with each control attribute (S11). The estimating unit 13 estimates an attribute value of each of the two or more control attributes from each of the feature quantity groups calculated by step S11 (S12).

In this way, the first example embodiment can improve accuracy of estimating, from a communication traffic related to usage of an application, a plurality of types of control attributes relating to communication control. Thus, communication control of the communication apparatus relevant to a usage status of an application or the like used in the communication can be performed by use of an estimated attribute value.

Note that the estimating apparatus 1 includes, as non-illustrated components, a processor, a memory, and a storage device. The storage device stores a computer program (an estimating program) that implements processing of the estimating method according to the first example embodiment. The processor reads the computer program into the memory from the storage device, and executes the computer program. Thus, the processor achieves functions of the feature quantity calculating units 111 to 11n, the calculating unit 12, and the estimating unit 13.

Alternatively, the feature quantity calculating units 111 to 11n, the calculating unit 12, and the estimating unit 13 may be each achieved by dedicated hardware. A part or whole of each component of each device may be achieved by general-purpose or dedicated circuitry, a processor or the like, or a combination thereof. These components may be constituted of a single chip, or may be constituted of a plurality of chips connected via a bus. A part or whole of each component of each device may be achieved by a combination of the circuitry described above or the like and a program. As the processor, a central processing unit (CPU), a graphics processing unit (GPU), a field-programmable gate array (FPGA), or the like can be used.

When a part or whole of each component of the estimating apparatus 1 is achieved by a plurality of information processing apparatuses, circuitries, or the like, the plurality of information processing apparatuses, circuitries, or the like may be concentratedly arranged or may be distributedly arranged. For example, the information processing apparatus, circuitry, or the like may be achieved as a form such as a client-server system or a cloud computing system in which each component is connected via a communication network. A function of the estimating apparatus 1 may be provided in a format of software as a service (SaaS).

The estimating apparatus 1 may be achieved by a plurality of computers. The estimating apparatus 1 may be installed on the communication apparatus described above. Note that the communication apparatus is assumed to include a server of a providing source of an application, a terminal of the providing destination, a relay device in a network, a base station, and the like.

The estimating apparatus 1 may acquire a communication traffic from outside, and store the communication traffic in an internal storage device or memory. It is assumed that the processor performs calculation or the like of a feature quantity group for the communication traffic stored in the storage device or memory. The processor may store each estimated attribute value in an internal storage device, or may output each estimated attribute value to an external system or storage device.

Second Example Embodiment

Figure 3:
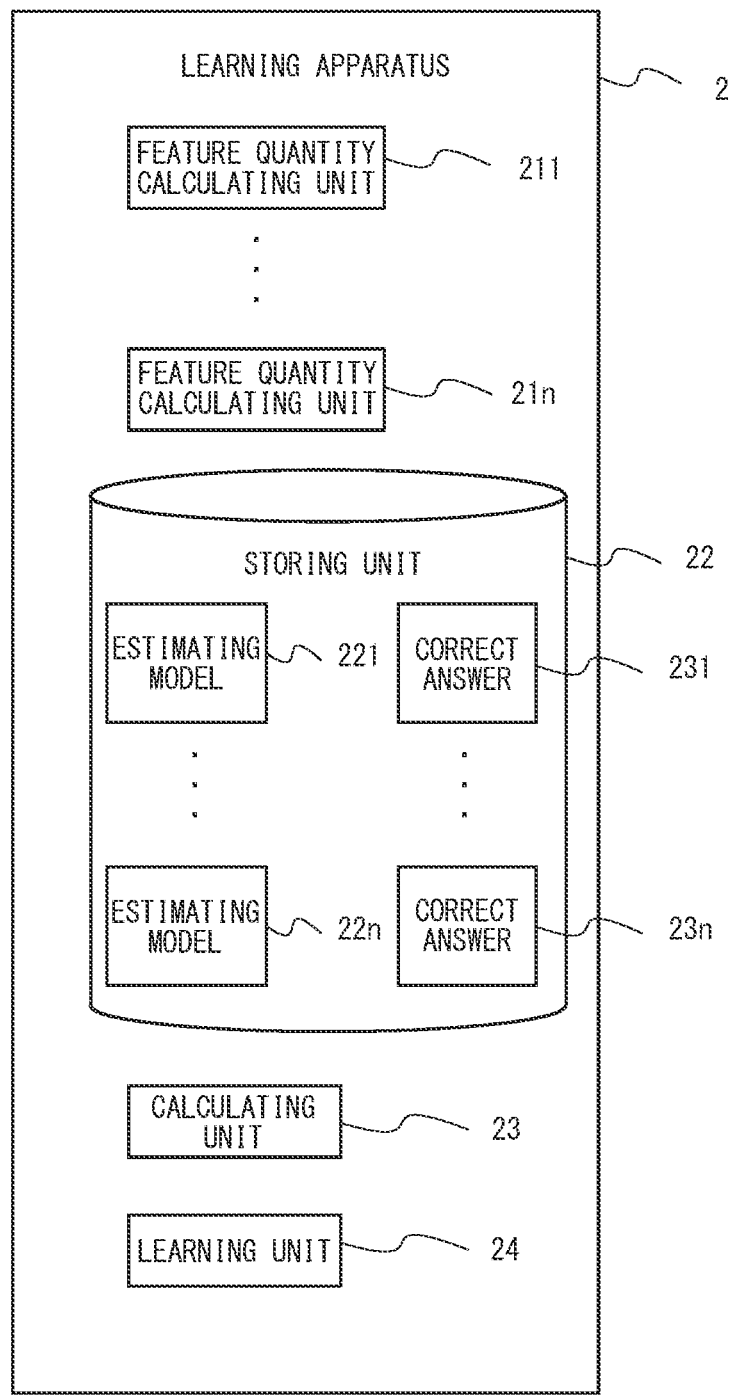
FIG. 3 is a block diagram illustrating a configuration of a learning apparatus according to a second example embodiment.

FIG. 3 is a block diagram illustrating a configuration of a learning apparatus 2 according to a second example embodiment. The learning apparatus 2 is an information processing apparatus that learns an estimating model for analyzing a communication traffic observed in a communication apparatus on a network, and estimating a control attribute relating to communication control of the communication apparatus relevant to a usage status of an application or the like used in the communication.

The learning apparatus 2 includes feature quantity calculating units 211 to 21n, a storing unit 22, a calculating unit 23, and a learning unit 24. Since the feature quantity calculating units 211 to 21n each have a function equal to that of each of the feature quantity calculating units 111 to 11n described above, description thereof is omitted. A control attribute and a feature quantity group are also similar to those in the first example embodiment described above.

The storing unit 22 is a volatile or non-volatile storage device that stores estimating models 221 to 22n and correct answers 231 to 23n. The estimating models 221 and the like are each associated with each of a plurality of types of control attributes. The estimating models 221 and the like are program modules or model formulae that implement processing of estimating, from the associated feature quantity group, an attribute value of each of the associated control attributes. For example, the estimating models 221 and the like are mathematical models that are calculated with, as input data, each feature quantity included in a feature quantity group and by use of a predetermined parameter (a weighting coefficient) for each piece of input data, and are expressed by, for example, a neural network or the like. Moreover, the estimating models 221 and the like change in output value for the same input value depending on a set value of a parameter. For example, the estimating model 221 calculates, from a first feature quantity group, a first attribute value being associated with a first control attribute by a first estimation logic. Similarly, the estimating model 22n calculates, from an n-th feature quantity group, an n-th attribute value being associated with an n-th control attribute by an n-th estimation logic.

Each of the correct answers 231 and the like is a piece of correct answer data of an attribute value in each of a plurality of types of control attributes. In other words, the correct answer 231 is a piece of data to be a correct answer of the first attribute value in the first control attribute, and the correct answer 23n is a piece of data to be a correct answer of the n-th attribute value in the n-th control attribute.

The calculating unit 23 calculates each of feature quantity groups from a communication traffic by use of each of the feature quantity calculating units 211 to 21n. For example, the calculating unit 23 calculates the first feature quantity group from a communication traffic by use of the feature quantity calculating unit 211 being associated with the first control attribute, and calculates a second feature quantity group from the communication traffic by use of the feature quantity calculating unit 212 being associated with a second control attribute. In other words, the calculating unit 23 calculates each feature quantity group by use of each of the feature quantity calculating units 211 to 21n.

The learning unit 24 learns a parameter of each of the plurality of estimating models 221 to 22n by use of each of the feature quantity groups calculated by the calculating unit 23 and each of the correct answers 231 to 23n, and stores the learned estimating model in the storing unit 22. For example, the learning unit 24 learns a parameter of the estimating model 221 by use of the first feature quantity group and the correct answer 231, and updates the storing unit 22 by the learned estimating model 221. Similarly, the learning unit 24 learns a parameter of the estimating model 222 by use of the second feature quantity group and the correct answer 232, and updates the storing unit 22 by the learned estimating model 222.

Figure 4:
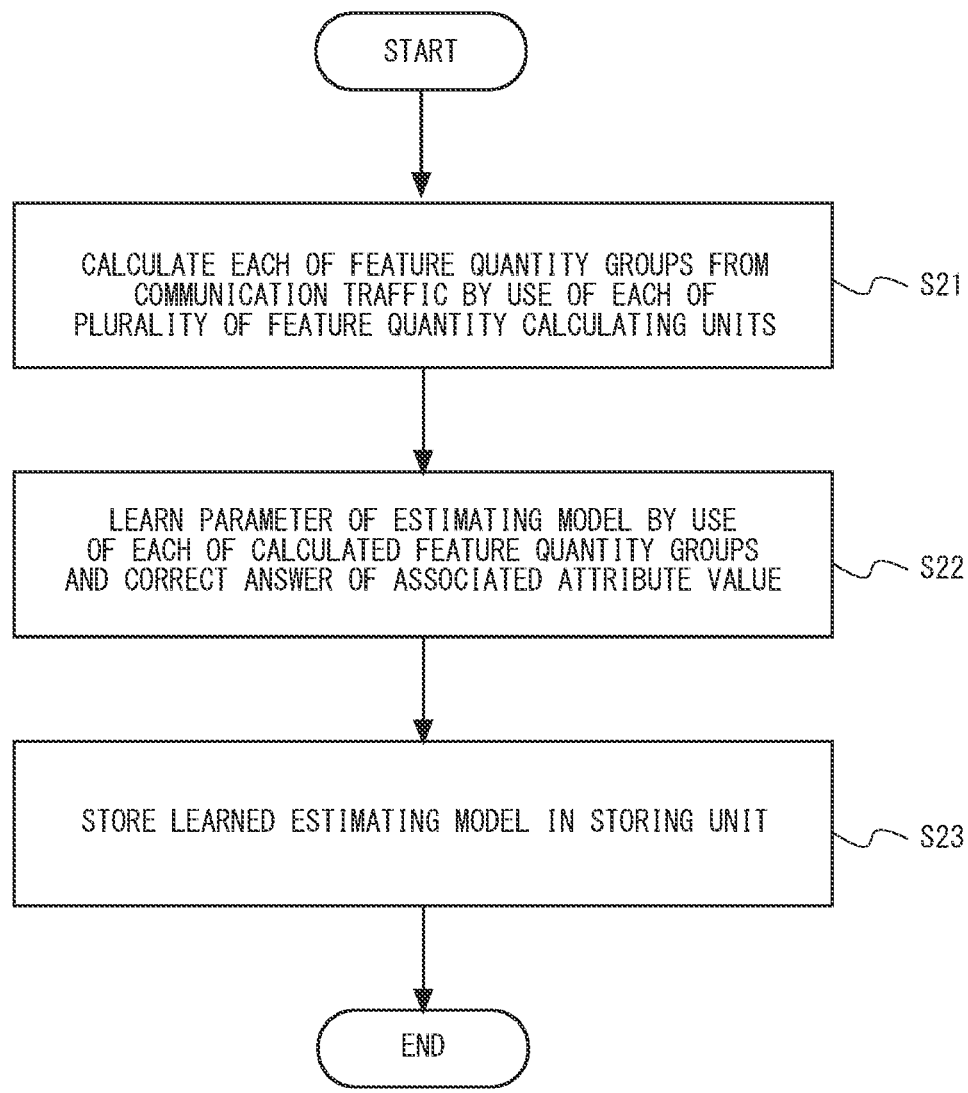
FIG. 4 is a flowchart illustrating a flow of a learning method according to the second example embodiment.

FIG. 4 is a flowchart illustrating a flow of a learning method according to the second example embodiment. First, the calculating unit 23 calculates each of feature quantity groups for each of the control attributes from a communication traffic by use of each of the feature quantity calculating units 211 and the like (S21). Next, the learning unit 24 learns a parameter of each of the estimating models 221 and the like by use of each of the feature quantity groups calculated by step S21 and each of the correct answers 231 and the like (S22). Thereafter, the learning unit 24 stores the learned estimating models 221 and the like in the storing unit 22 (S23).

By using the estimating model learned in this way and the feature quantity calculating units 211 and the like, accuracy of estimating, from a communication traffic of an estimating target, a plurality of types of control attributes relating to communication control can be improved. Thus, communication control of the communication apparatus relevant to a usage status of an application or the like used in the communication can be performed by use of an estimated attribute value.

Note that the learning apparatus 2 includes, as non-illustrated components, a processor, a memory, and a storage device. The storage device stores a computer program (a learning program) that implements processing of the learning method according to the second example embodiment. The processor reads the computer program into the memory from the storage device, and executes the computer program. Thus, the processor achieves functions of the feature quantity calculating units 211 to 21n, the calculating unit 23, and the learning unit 24.

Alternatively, the feature quantity calculating units 211 to 21n, the calculating unit 23, and the learning unit 24 may be each achieved by dedicated hardware. A part or whole of each component of each device may be achieved by general-purpose or dedicated circuitry, a processor or the like, or a combination thereof. These components may be constituted of a single chip, or may be constituted of a plurality of chips connected via a bus. A part or whole of each component of each device may be achieved by a combination of the circuitry described above or the like and a program. As the processor, a CPU, a GPU, an FPGA, or the like can be used.

When a part or whole of each component of the learning apparatus 2 is achieved by a plurality of information processing apparatus, circuitries, or the like, the plurality of information processing apparatuses, circuitries, or the like may be concentratedly arranged or may be distributedly arranged. For example, the plurality of information processing apparatuses, circuitries, or the like may be achieved as a form such as a client-server system or a cloud computing system in which each component is connected via a communication network. A function of the learning apparatus 2 may be provided in a format of an SaaS.

The learning apparatus 2 may be achieved by a plurality of computers. The learning apparatus 2 may be installed on the communication device described above. Note that the communication apparatus is assumed to include a server of a providing source of an application, a terminal of the providing source, a relay device in a network, a base station, and the like.

The learning apparatus 2 may acquire a communication traffic and the correct answers 231 and the like from outside, and store the communication traffic and the correct answers 231 and the like in an internal storage device or memory. It is assumed that the processor performs calculation or the like of a feature quantity group for the communication traffic stored in the storage device or memory. The processor may output a learned estimating model to an external system or storage device.

Third Example Embodiment

A third example embodiment is an example in which Example Embodiments 1 and 2 described above are combined and achieved as an estimating system. An estimating system according to the third example embodiment includes at least a plurality of feature quantity calculating units, a storing unit storing a plurality of estimating models and a correct answer of an attribute value, a first calculating unit, a learning unit, a second calculating unit, and an estimating unit. Herein, the plurality of feature quantity calculating units are equivalent to the feature quantity calculating units 111 and the like or feature quantity calculating units 211 and the like described above. The storing unit is equivalent to the storing unit 22 described above. The first calculating unit is equivalent to the calculating unit 23 described above. The learning unit is equivalent to the learning unit 24 described above. The second calculating unit is equivalent to the calculating unit 12 described above. The estimating unit is equivalent to the estimating unit 13 described above. Thus, as described above, accuracy of estimating, from a communication traffic related to usage of an application, a plurality of types of control attributes relating to communication control can be improved.

Herein, it is assumed that each of the plurality of feature quantity calculating units implements processing of calculating the feature quantity group from a measurement section relevant to an associated control attribute in the communication traffic. Thus, since estimating accuracy can be further heightened in consideration of a change of a feature quantity resulting from a state change or the like during application usage, flexible communication control can be achieved.

The estimating system preferably further includes a selecting unit that selects a part from among the plurality of types of control attributes. In this case, the calculating unit calculates the feature quantity group from the communication traffic by use of the feature quantity calculating unit being associated with the selected control attribute, and the estimating unit estimates the attribute value of the selected control attribute from the calculated feature quantity group. Thereafter, the selecting unit preferably further selects an unselected control attribute among the plurality of types of control attributes, based on the estimated attribute value. Consequently, since a required feature quantity calculating unit is operated according to an estimated attribute value, estimating processing can be made efficient.

Furthermore, the plurality of types of control attributes are preferably defined by a hierarchical structure having a plurality of hierarchical layers. For example, it is assumed that a differing second control attribute being a low-order hierarchical layer of a first control attribute belongs to each of a plurality of first attribute values that the first control attribute among the plurality of types of control attributes can take. In this case, the selecting unit preferably selects a control attribute in a sequence of a high order to a low order of the hierarchical structure among the plurality of types of control attributes, and, after the attribute value of the selected control attribute is estimated by the estimating unit, further selects a control attribute belonging to the estimated attribute value. In this way, by ascertaining a control attribute from the highest order in turn in accordance with the hierarchical structure, processing times of feature quantity calculating processing and estimating processing can be made efficient and a calculating processing load of an estimating apparatus can be reduced without calculating all feature quantities. For example, when a control attribute of the highest order is an application classification and a low-order hierarchical layer thereof is a site classification, the number of application classifications is small by far as compared to the number of sites, and, therefore, much of irrelevant feature quantity calculating processing can be avoided.

The communication traffic is observed at usage of an application. Thus, for example, the hierarchical structure may be defined in such a way as a first hierarchical layer, a low-order second hierarchical layer thereof, and a further low-order third hierarchical layer thereof. In this case, the first control attribute indicating a usage purpose of the application belongs to the first hierarchical layer. The second control attribute indicating a providing source of the application differing for each of the usage purposes belongs to the second hierarchical layer being a low order of the first hierarchical layer. A third control attribute indicating a property of the application differing for each of the providing sources belongs to the third hierarchical layer being a low order of the second hierarchical layer.

The estimating system may further include a first storing unit that performs hierarchization and storing, based on the hierarchical structure, with each of the plurality of feature quantity calculating units as a module. In this case, the calculating unit specifies the feature quantity calculating unit being associated with the selected control attribute from within the first storing unit, and calculates a feature quantity group from the communication traffic by use of the specified feature quantity calculating unit. Consequently, a feature quantity calculating unit can be efficiently selected based on a hierarchical structure similar to that of a control attribute.

The learning unit may hierarchize the learned estimating model, based on the hierarchical structure, and store the hierarchized estimating model in the second storing unit. Consequently, an estimating model can be efficiently selected based on a hierarchical structure similar to that of a control attribute.

Figure 5:
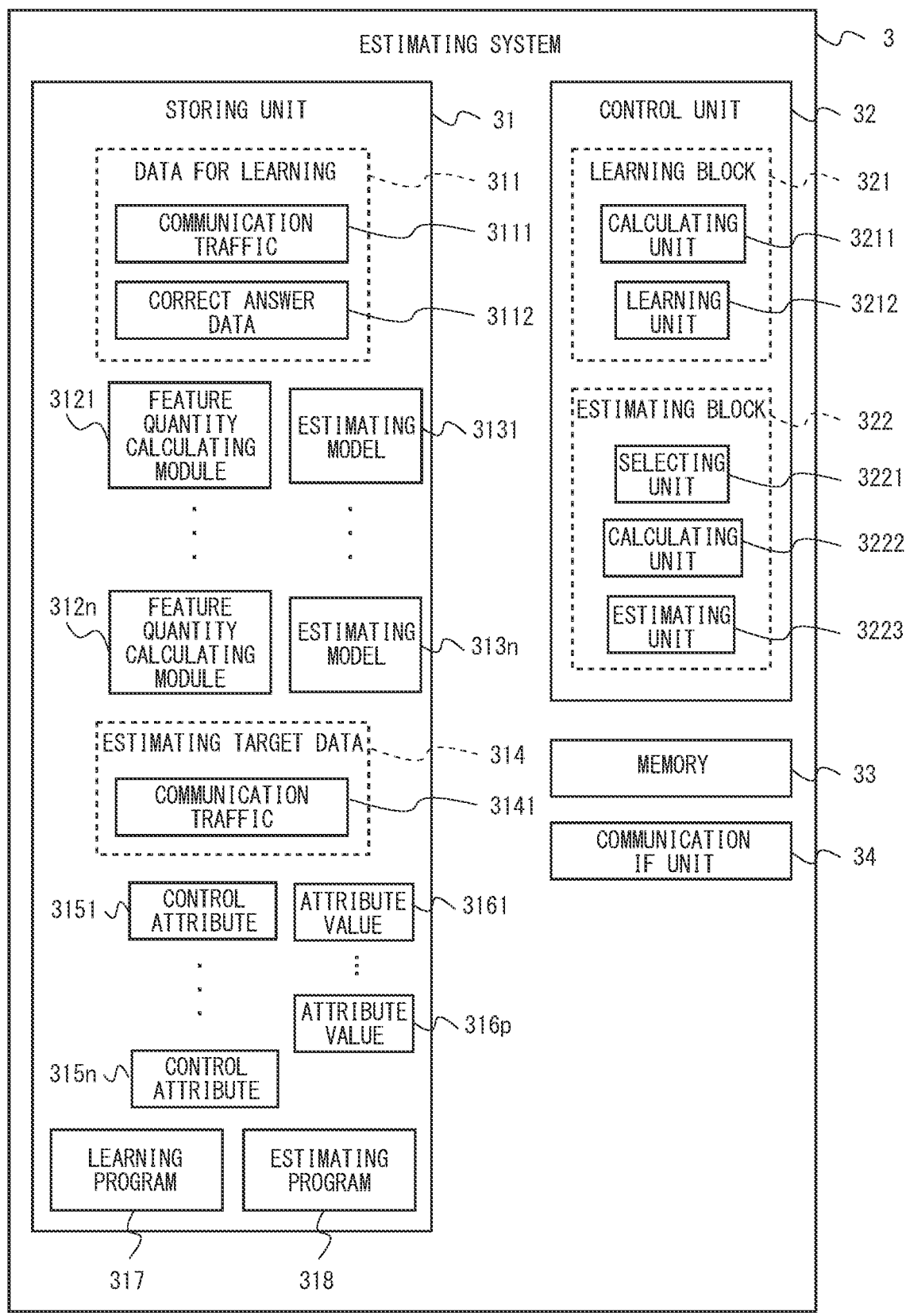
FIG. 5 is a block diagram illustrating a configuration of an estimating system according to a third example embodiment.

FIG. 5 is a block diagram illustrating a configuration of an estimating system 3 according to the third example embodiment. The estimating system 3 is an information system in which the estimating apparatus 1 and learning apparatus 2 described above are integrated. Note that the estimating system 3 may be achieved by a plurality of computers. The estimating system 3 includes a storing unit 31, a control unit 32, a memory 33, and a communication interface (IF) unit 34.

The storing unit 31 is a storage device such as a hard disc or a flash memory. The storing unit 31 is a specific example of the first storing unit and second storing unit described above. The storing unit 31 stores data for learning 311, feature quantity calculating modules 3121 to 312$n$, estimating models 3131 to 313$n$, an estimating target data 314, control attributes 3151 to 315$n$, attribute values 3161 to 316$p$ ($p$ is a natural number equal to or more than 2 and less than n), a learning program 317, and an estimating program 318.

The data for learning 311 are data used in order to machine-learn the estimating models 3131 and the like. The data for learning 311 include a communication traffic 3111 and correct answer data 3112. The communication traffic 3111 is a cluster of communication traffics observed in the communication apparatus for a predetermined period. The correct answer data 3112 are equivalent to the correct answers 231 and the like, and are data to be an attribute value for each control attribute.

The feature quantity calculating modules 3121 to 312$n$ are equivalent to the feature quantity calculating units 111 to 11$n$ and feature quantity calculating units 211 to 21$n$ described above. Each of the feature quantity calculating modules 3121 and the like is associated with any of the control attributes, and is a software module that calculates a feature quantity group from the communication traffic 3111. The estimating models 3131 to 313$n$ are equivalent to the estimating models 221 to 22$n$ described above. Each of the estimating models 3131 and the like is associated with any of the control attributes, performs calculation for an input of a feature quantity group by use of each parameter, and calculates an estimated value of an associated control attribute as an attribute value.

The estimating target data 314 are input data to be a target for estimating an attribute value with regard to at least two or more of a plurality of types of control attributes. In other words, a communication traffic 3141 included in the estimating target data 314 is a piece of data observed in the communication apparatus for a predetermined period.

The control attributes 3151 to 315n are pieces of information being equivalent to a plurality of types of control attributes. Herein, it is assumed that the control attributes 3151 to 315n are defined by a hierarchical structure having a plurality of hierarchical layers as described above. For example, it is assumed that a differing second control attribute being a low-order hierarchical layer of a first control attribute belongs to each of a plurality of first attribute values that the first control attribute of a certain high-order hierarchical layer can take. In other words, in this case, a control attribute is defined by a tree structure with a highest-order hierarchical layer as a root. A hierarchical structure according to the present example embodiment may have at least two or more layers. Note that the control attributes 3151 and the like do not necessarily need to be retained as data. The attribute values 3161 to 316p are attribute values as estimating results being associated with p control attributes of an estimating target.

The learning program 317 is a computer program that implements a learning method according to the third example embodiment. The estimating program 318 is a computer program that implements an estimating method according to the third example embodiment.

Herein, specific examples of a hierarchical structure of a control attribute, a feature quantity calculating module, and an estimating model are described. Herein, a case of three layers is described. First, it is assumed that a first control attribute indicating a usage purpose of an application belongs to a highest-order first hierarchical layer. It can also be said that a usage purpose of an application is a classification of the application. In other words, a usage purpose of an application indicates a type of an application being used by a user in a flow in a communication traffic. When the first control attribute is "usage purpose of an application", "video playback", "Web browsing", "network-camera-captured image playback", and the like, for example, can be cited as a plurality of first attribute values that the first control attribute can take. For the feature quantity calculating module being associated with the first control attribute that is a first layer, calculating a communication traffic quantity per unit time, an average packet size, or the like from a communication traffic as a feature quantity group, for example, can be cited. An estimating model being associated with the first control attribute outputs (calculates, estimates) any of a plurality of first attribute values that the first control attribute can take, with a feature quantity group such as a communication traffic quantity or an average packet size per unit time as an input.

Next, it is assumed that a plurality of second control attributes each indicating a providing source of the application belongs to the second hierarchical layer being one order lower than the first layer. In other words, when the first attribute value of the first layer is "video playback", the second control attribute being a second layer is, for example, "video site classification", and "site A" (a video distribution site), "site B" (a link page to a video file or the like), and the like can be cited as a plurality of second attribute values that can be taken. For a feature quantity calculating module being associated with the second control attribute "video site classification", calculating a packet size, an arrival interval, a distribution of a 5-tuple, and the like for several packets from a head of a flow, as a feature quantity group from a communication traffic, for example, can be cited. An estimating model being associated with the second control attribute "video site classification" outputs any of a plurality of second attribute values that the second control attribute can take, with a feature quantity group such as a packet size, an arrival interval, and a distribution of a 5-tuple for several packets from a head of a flow as an input. Particularly, since a server differs for each site, an establishing procedure of a session differs, and a feature of a server appears. Thus, an attribute value of "video site classification" can be estimated by the estimating model with satisfactory accuracy.

When the first attribute value of the first layer is "Web browsing", the second control attribute being the second layer is, for example, "Web site classification", and "site C", "site D", and the like, for example, can be cited as a plurality of second attribute values that can be taken. For a feature quantity calculating module being associated with the second control attribute "Web site classification", calculating a packet size, an arrival interval, a distribution of a 5-tuple, and the like for several packets from a head of a flow, as a feature quantity group from a communication traffic, for example, can be cited. An estimating model being associated with the second control attribute "Web site classification" outputs any of a plurality of second attribute values that the second control attribute can take, with a feature quantity group such as a packet size, an arrival interval, and a distribution of a 5-tuple for several packets from a head of a flow as an input. Particularly, since a server differs for each site, an establishing procedure of a session differs, and a feature of a server appears. Thus, an attribute value of "Web site classification" can be estimated by the estimating model with satisfactory accuracy.

When the first attribute value of the first layer is "network-camera-captured image playback", the second control attribute being the second layer is, for example, "camera classification", and "camera E" (manufactured by X cooperation), "camera F" (manufactured by Y cooperation), and the like, for example, can be cited as a plurality of second attribute values that can be taken. For a feature quantity calculating module being associated with the second control attribute "camera classification", calculating a packet size, an arrival interval, and the like for several packets from a head of a flow, as a feature quantity group from a communication traffic, for example, can be cited. An estimating model being associated with the second control attribute "camera classification" outputs any of a plurality of second attribute values that the second control attribute can take, with a feature quantity group such as a packet size and an arrival interval for several packets from a head of a flow as an input. Particularly, since a server differs for each site, an establishing procedure of a session differs, and a feature of a server appears. Thus, an attribute value of "camera classification" can be estimated by the estimating model with satisfactory accuracy.

Further, it is assumed that the third control attribute indicating a property of the application differing for each of the providing sources belongs to the third hierarchical layer being a hierarchical layer one order lower than the second hierarchical layer. For example, when the second attribute value of the second layer is "site A", the third control attribute being a third layer is, for example, "video quality of site A", and a cluster of "playback rate", "resolution", and the like, for example, can be cited as a plurality of third attribute values that can be taken. For a feature quantity calculating module being associated with the third control attribute "video quality of site A", calculating a communication data quantity, a distribution of a packet size, and the like as a feature quantity group from a communication traffic, for example, can be cited. An estimating model being associated with the third control attribute "video quality of site A" outputs any of a plurality of third attribute values that the third control attribute can take, with a feature quantity group such as a communication data quantity and a distribution of a packet size for a predetermined period of a flow as an input. Particularly, video quality may differ between a head, a middle, and a latter half of a flow, video quality can be appropriately estimated by the estimating model depending on a period.

When the second attribute value of the second layer is "site C", the third control attribute being the third layer is, for example, "contents classification of site C", and "news", "shopping", and the like, for example, can be cited as a plurality of third attribute values that can be taken. For a feature quantity calculating module being associated with the third control attribute "contents classification of site C", calculating a total communication data quantity, a distribution of a packet size, and the like as a feature quantity group from a communication traffic, for example, can be cited. An estimating model being associated with the third control attribute "contents classification of site C" outputs any of a plurality of third attribute values that the third control attribute can take, with a feature quantity group such as a total communication data quantity and a distribution of a packet size as an input. For example, since a feature of a traffic near a head packet of a flow resembles in the same site, but a policy of a page differs in a different site, a data quantity and a packet size in an overall flow form features, and, therefore, contents classification can be appropriately estimated by considering a traffic in a total period by the estimating model.

When the second attribute value of the second layer is "camera E", the third control attribute being the third layer is, for example, "capturing state of camera E", and "moving", "being still", and the like (of a subject), for example, can be cited as a plurality of third attribute values that can be taken. For a feature quantity calculating module being associated with the third control attribute "capturing state of camera E", calculating a communication data quantity, a distribution of a packet size, and the like as a feature quantity group from a communication traffic, for example, can be cited. An estimating model being associated with the third control attribute "capturing state of camera E" outputs any of a plurality of third attribute values that the third control attribute can take, with a feature quantity group such as a communication data quantity and a distribution of a packet size as an input. For example, since an image compression ratio varies depending on a capturing state of a subject, and a traffic pattern changes, a capturing state can be appropriately estimated by the estimating model.

Herein, one example is described with regard to processing of a feature quantity calculating module being associated with the above-described second control attribute "video site classification". First, "distribution of 5-tuple" among the feature quantity group used to identify a video site classification includes, for example, the number of IP addresses and the number of ports on a server side in a flow group identified as a video traffic in a high-order layer. A feature quantity group calculated by the feature quantity calculating module can include a statistic (an average value, a maximum value, a minimum value, a variance, and the like) of a total data quantity, a packet size, and the like for several packets from a head of a selected flow (a packet group of the same 5-tuple).

For example, the following processing can be cited for a selecting method of a flow.

First, as a background, in video distribution, (1) main contents are distributed by load dispersion of a server, (2) attached contents such as an advertisement are downloaded from another site, and, therefore, a video traffic tends to be downloaded from a plurality of flows on a receiving side.

Thus, in a case of (1), due to dispersion of a load of the server, a receiving-side terminal receives video data from a plurality of ports of a plurality of servers (a plurality of IP addresses). In other words, the number of servers and the number of ports differ for each video site. Thus, for a feature quantity calculating module for identifying "video site classification", calculating the number of servers and the number of ports as a feature quantity group, for example, can be cited.

In a case of (2), during video viewing, video data alone are not purely received, information such as a video advertisement is also received, and, therefore, a traffic quantity for delivering the video advertisement becomes information having a feature. Thus, the feature quantity calculating module for identifying "video site classification" first calculates a data quantity for each flow (the same 5-tuple), and sorts the flows in a sequence of data quantities thereof. The feature quantity calculating module selects, as video distribution flows, high-order M_up flows having large data quantities in a sort result, and selects, as attached contents distribution flows such as an advertisement, low-order M_low flows having small data quantities. Thereafter, for the feature quantity calculating module, calculating "packet size and arrival interval for several packets from a head of a flow" as a feature quantity for each of the selected M_up and M_low flows can be cited.

The memory 33 is a non-volatile storage device such as a random access memory (RAM), and is a storage area for transitorily retaining information during an operation of the control unit 32. The communication IF unit 34 is an interface that performs input/output from/to outside of the estimating system 3.

The control unit 32 is a processor, i.e., a control device that controls each component of the estimating system 3. The control unit 32 includes a learning block 321 and an estimating block 322. The learning block 321 includes a calculating unit 3211 and a learning unit 3212. The calculating unit 3211 is a specific example of the first calculating unit described above, inputs the communication traffic 3111 to all of the feature quantity calculating modules 3121 to 312$n$, and calculates each feature quantity group. The learning unit 3212 is a specific example of the learning unit 24 described above, and machine-learns parameters of the associated estimating models 3131 to 313$n$ by use of each of the feature quantity groups for each control attribute calculated by the calculating unit 3211, and the correct answer data 3112. The learning unit 3212 hierarchizes the learned estimating models 3131 to 313$n$, based on a hierarchical structure, stores the learned estimating models 3131 to 313$n$ in the storing unit 31, and updates the storing unit 31.

The estimating block 322 includes a selecting unit 3221, a calculating unit 3222, and an estimating unit 3223. The selecting unit 3221 selects a control attribute in a sequence of a high order to a low order of the hierarchical structure of control attributes. The selecting unit 3221 further selects, after the attribute value of the selected control attribute is estimated by the estimating unit 3223, a control attribute belonging to the estimated attribute value.

The calculating unit 3222 specifies the feature quantity calculating modules 3121 to 312$n$ being associated with the selected control attribute from within the storing unit 31, and calculates a feature quantity group from the communication traffic 3141 by use of the specified feature quantity calculating module. The estimating unit 3223 estimates an attribute value of the selected control attribute from the feature quantity group calculated by the calculating unit 3222.

Note that the control unit 32 reads the learning program 317 and the estimating program 318 into the memory 33 from the storing unit 31, and executes the learning program 317 and the estimating program 318. Consequently, the control unit 32 achieves functions of the learning block 321 and the estimating block 322.

Figure 6:
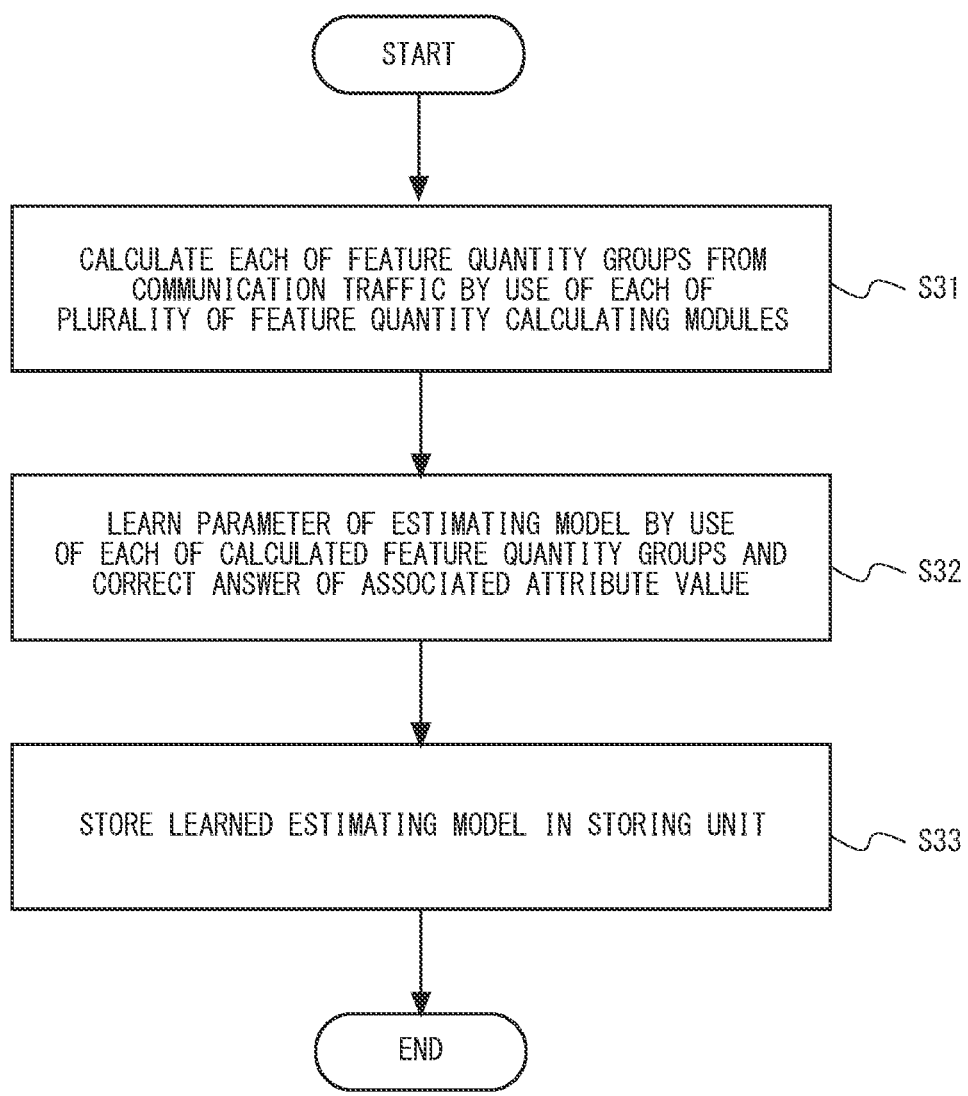
FIG. 6 is a flowchart illustrating a flow of a learning method according to the third example embodiment.

FIG. 6 is a flowchart illustrating a flow of the learning method according to the third example embodiment. First, the calculating unit 3211 reads the communication traffic 3111 and the feature quantity calculating modules 3121 to 312n from the storing unit 31, inputs the communication traffic 3111 to each feature quantity calculating module, and calculates each feature quantity group (S31).

Next, the learning unit 3212 reads the correct answer data 3112 and the estimating models 3131 to 313n from the storing unit 31, and learns a parameter of each of the estimating models 3131 and the like by use of each the feature quantity groups calculated by step S31 and each of the correct answer data 3112 (S32). Thereafter, the learning unit 3212 stores the learned estimating models 3131 and the like in the storing unit 31 (S33).

Figure 7:
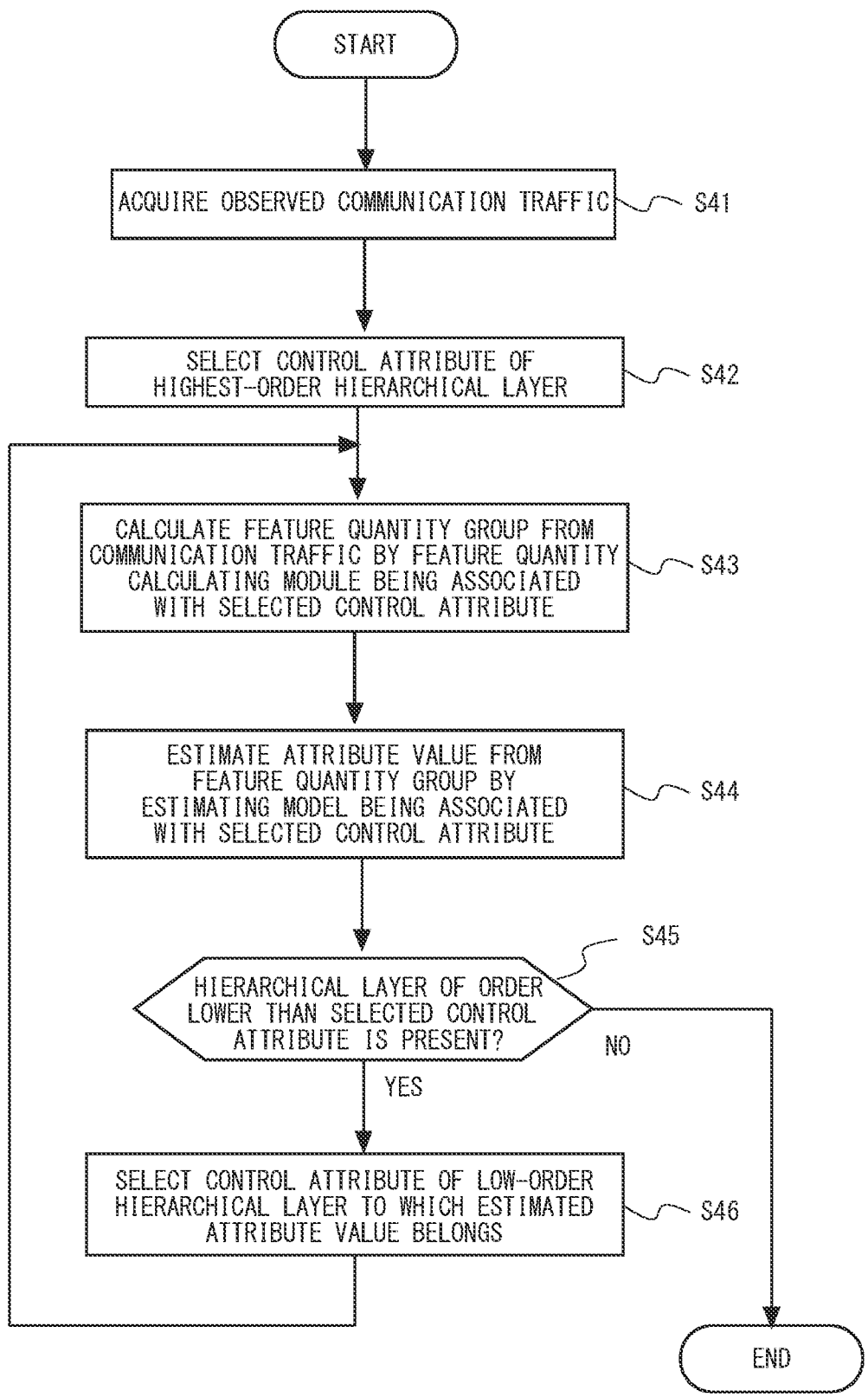
FIG. 7 is a flowchart illustrating a flow of an estimating method according to the third example embodiment.

FIG. 7 is a flowchart illustrating a flow of an estimating method according to the third example embodiment. First, the selecting unit 3221 acquires the observed communication traffic 3141 from outside or the like (S41), and stores the communication traffic 3141 in the storing unit 31. Next, the selecting unit 3221 selects a control attribute of the highest-order hierarchical layer, based on the hierarchical structure (S42).

The calculating unit 3222 specifies and reads, from within the storing unit 31, a feature quantity calculating module being associated with the control attribute selected in step S42. Herein, a feature quantity calculating module being associated with the control attribute of the highest-order hierarchical layer is specified. The calculating unit 3222 reads the communication traffic 3141 from the storing unit 31, inputs the communication traffic 3141 to the specified feature quantity calculating module, and calculates a feature quantity group (S43).

Further, the estimating unit 3223 specifies and reads, from within the storing unit 31, an estimating model being associated with the control attribute selected in step S42. Herein, an estimating model being associated with the control attribute of the highest-order hierarchical layer is specified. Note that each estimating model in the storing unit 31 has been machine-learned by the data for learning 311.

The estimating unit 3223 inputs the feature quantity group calculated by step S43 to the specified estimating model, and estimates an attribute value (S44). Herein, an attribute value being associated with the control attribute of the highest-order hierarchical layer is calculated.

Thereafter, the selecting unit 3221 determines, based on the hierarchical structure, whether a hierarchical layer of an order lower than the selected control attribute is present (S45). Herein, since the second hierarchical layer is present one order lower than the highest-order hierarchical layer, the flow moves to step S46. The selecting unit 3221 selects a control attribute of a low-order hierarchical layer to which the attribute value estimated by step S44 belongs (S46). Hereafter, steps S43 to S46 are repeated, and the estimating processing is finished when step S45 determines NO.

Figure 8:
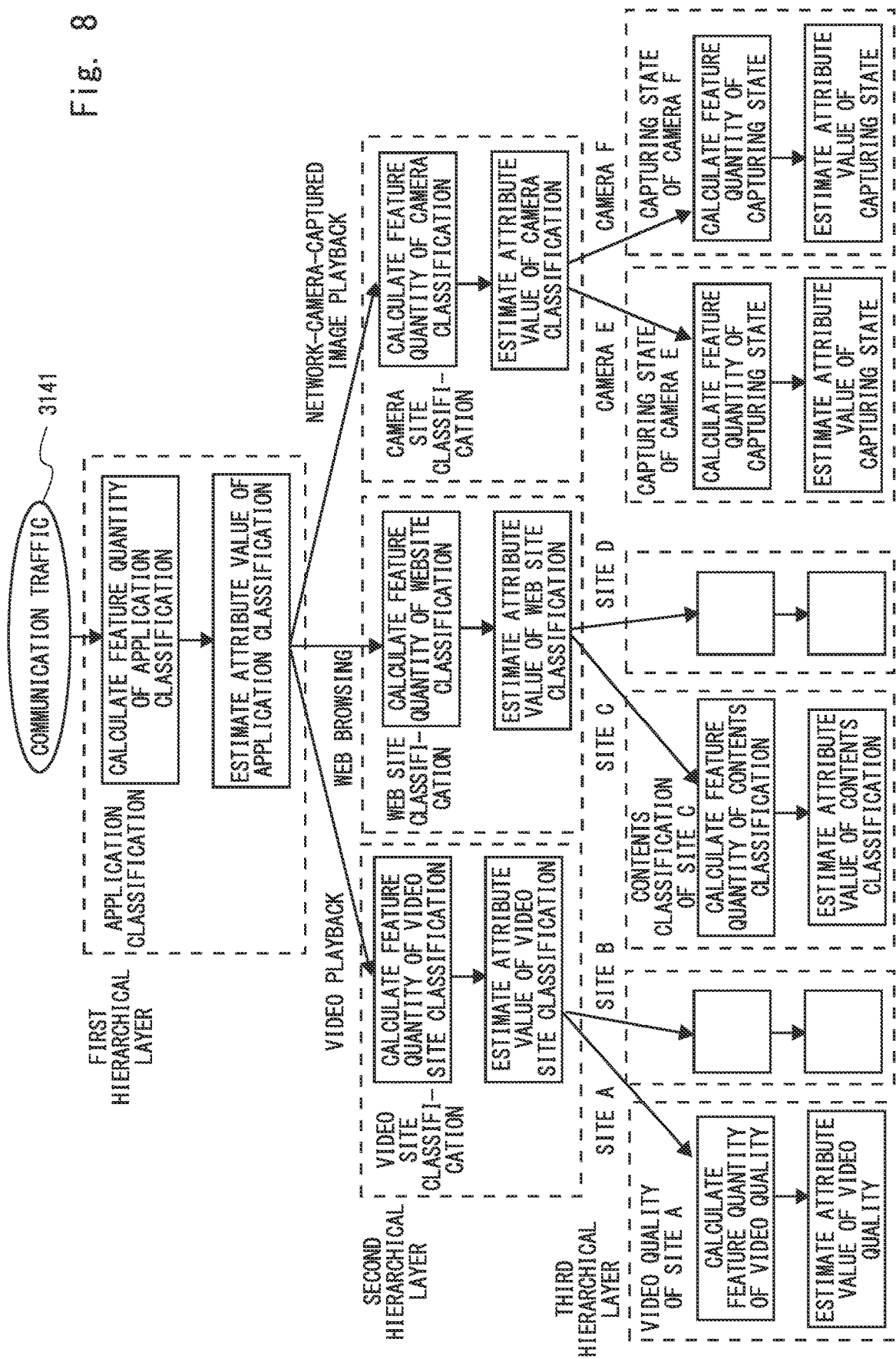
FIG. 8 is a diagram illustrating an example of hierarchization of estimating processing according to the third example embodiment.

FIG. 8 is a diagram illustrating an example of hierarchization of estimating processing according to the third example embodiment. Herein, when the communication traffic 3141 is acquired, estimation (identification, determination) of the first attribute value of the first hierarchical layer "application classification" is performed first. The selecting unit 3221 determines whether the estimated first attribute value is "video playback", "Web browsing", or "network-camera-captured image playback", and selects a control attribute of the second hierarchical layer (S36). Similarly, the second attribute value of a control attribute of the selected second hierarchical layer is estimated. The selecting unit 3221 determines the second attribute value, and selects a control attribute of the third hierarchical layer. Similarly, the third attribute value of a control attribute of the selected third hierarchical layer is estimated. Thus, feature quantity calculating processing and estimating processing being associated with most of control attributes that belong to the second or third hierarchical layer but are not selected are not executed. Thus, the estimating method according to the present example embodiment can significantly efficiently perform estimation as compared to the estimating method according to the first example embodiment.

Furthermore, since an application classification with a few options as compared to a low-order hierarchical layer is set for the highest-order hierarchical layer of the hierarchical structure, feature quantity calculating processing and the like for each of a large number of existing sites can be omitted.

Figure 9:
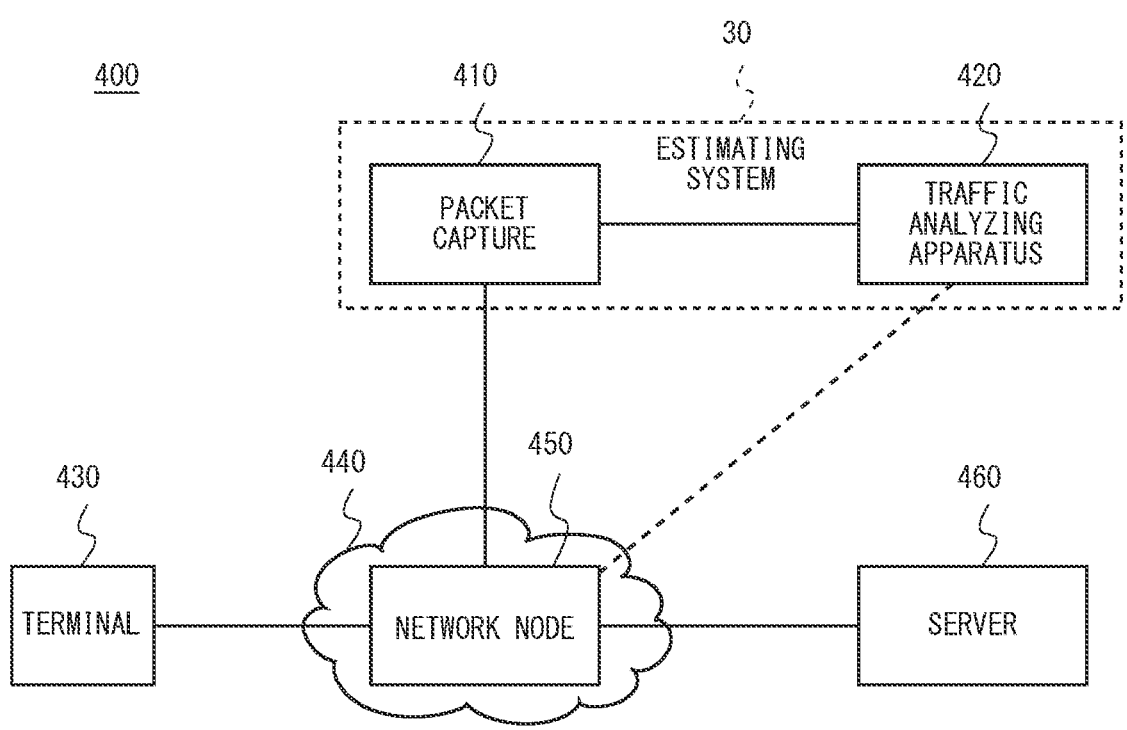
FIG. 9 is a block diagram illustrating a configuration of a network system according to Example 3-1 of the third example embodiment.

Herein, configurations in three examples according to the third example embodiment are described. FIG. 9 is a block diagram illustrating a configuration of a network system 400 according to Example 3-1 of the third example embodiment. The network system 400 includes a packet capture 410, a traffic analyzing apparatus 420, a terminal 430, a network node 450, and a server 460. Herein, the packet capture (packet monitor) 410 captures a packet (frame) being a protocol data unit (PDU) flowing in a communication network 440. The packet capture 410 analyzes a header or the like of the captured packet, and analyzes, for example, a transmission source address of the packet, a transmission destination address, a port, a length (a packet size), a packet frequency, a packet transmission time interval, and the like. Note that the PDU is referred to as a "frame" in a data link layer (a layer 2 (L2)) of an Open System Interconnection (OSI) reference model of International Organization for Standardization (ISO), and a "packet" in a network layer (layer 3 (L3)).

The packet capture 410 connects to the network node 450 or the like arranged inside the communication network 440, and captures a packet flowing on the communication network 440, for example, a packet transmitted and received between the terminal 430 and the server 460. Herein, the network node 450 is, for example, a relay device such as a router (an L3 switch). The network node 450 mirrors one or a plurality of ports (duplication source ports) being monitor targets to a port (a duplication destination port) to which the packet capture 410 connects. Accordingly, the packet capture 410 can monitor all transmitted and received packets passing through a port of the network node 450. The packet capture 410 sets a network interface card (NIC) to a promiscuous mode in such a way that a signal that is not a data packet destined for the packet capture 410 is also loaded. The packet capture 410 may only refer to a destination of a packet, an IP address of a transmission source, and the like. Thus, a communication traffic may be encrypted including a request heater and the like.

Note that, in FIG. 9, the network node 450 may be a gateway node inside a core network, a base station of a wireless access network, or the like. The traffic analyzing apparatus 420 acquires time-series data of a communication traffic (throughput) between the terminal 430 and the server 460 or between terminals calculated by the packet capture 410, and performs an analysis of the traffic. Further, it is assumed that the traffic analyzing apparatus 420 retains inside the feature quantity calculating modules 3121 and the like and the estimating models 3131 and the like, and by use of which, operates as the learned estimating block 322. Thus, the packet capture 410 and the traffic analyzing apparatus 420 may be collectively regarded as an estimating system 30 according to the third example embodiment.

Figure 10:
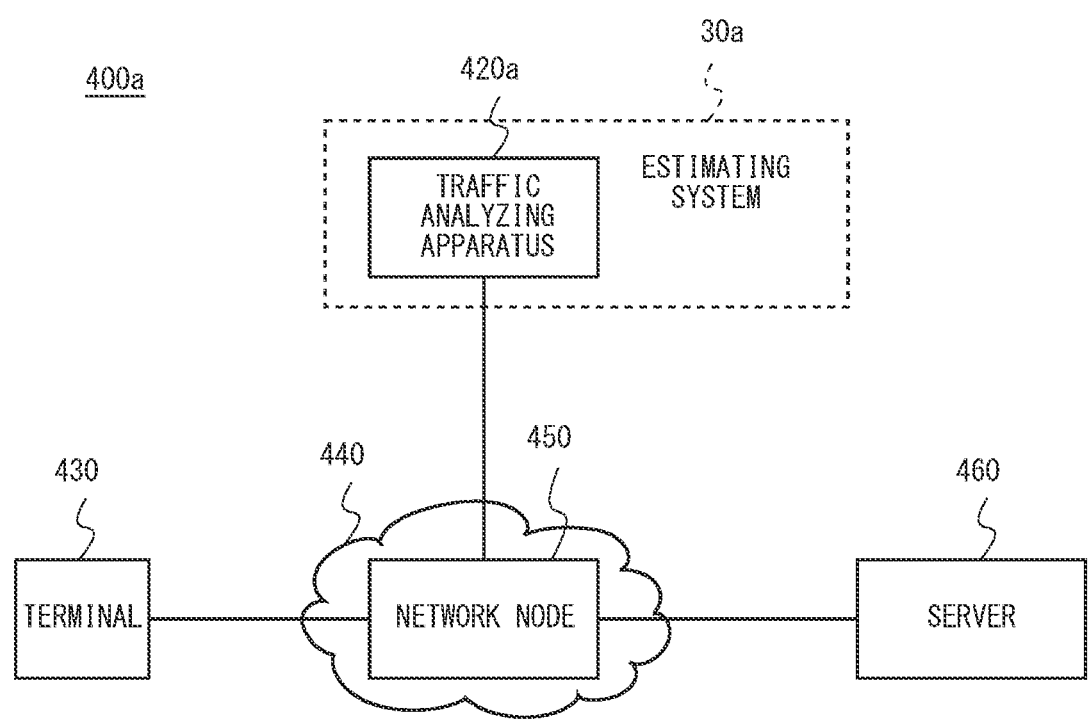
FIG. 10 is a block diagram illustrating a configuration of a network system according to Example 3-2 of the third example embodiment.

FIG. 10 is a block diagram illustrating a configuration of a network system 400*a* according to Example 3-2 of the third example embodiment. The network system 400*a* implements the traffic analyzing apparatus 420 inside the packet capture 410 in FIG. 9, and serves as a traffic analyzing apparatus 420*a*, i.e., an estimating system 30*a*.

Figure 11:
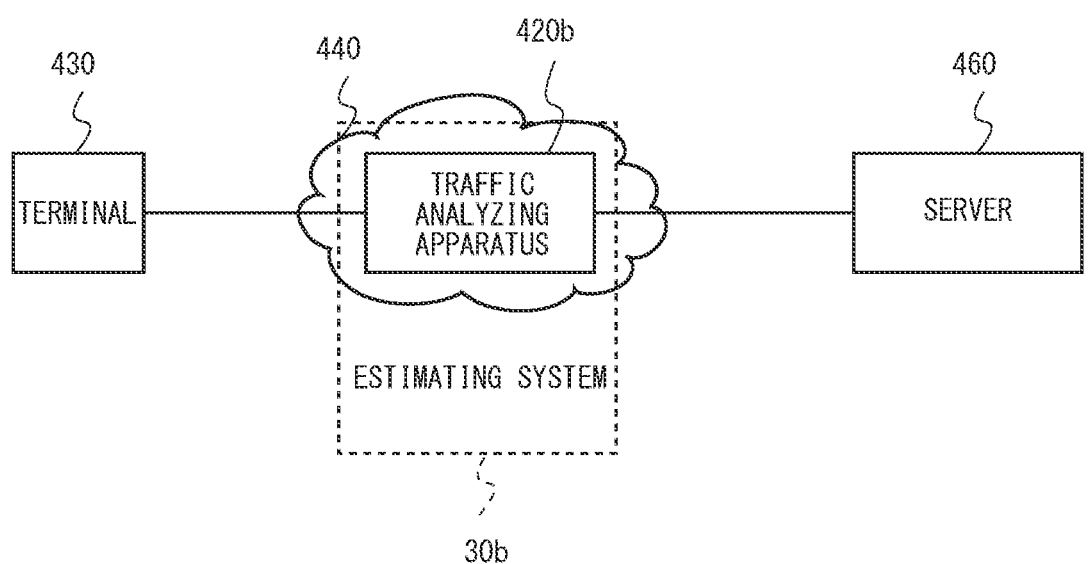
FIG. 11 is a block diagram illustrating a configuration of a network system according to Example 3-3 of the third example embodiment.

FIG. 11 is a block diagram illustrating a configuration of a network system 400*b* according to Example 3-3 of the third example embodiment. The network system 400*b* implements the traffic analyzing apparatus 420*a* inside the network node 450 in FIG. 10, and serves as a traffic analyzing apparatus 420*b*, i.e., the estimating system 30*a*. The traffic analyzing apparatus 420*b* is a node inside the communication network 440, and may be, for example, a relay device such as a router, a wireless base station, a mobile edge computing (MEC) server, a gateway or a server on a core network, or the like.

Alternatively, a traffic analyzing apparatus may be implemented in the terminal 430 or the server 460 communicating with the terminal 430, capture a packet flowing to the terminal 430 or a packet transmitted from the terminal 430 to the server 460, and analyze a traffic. Note that the communication network 440 in FIGS. 9 to 11 may provide an inter-terminal voice call service (Voice Over IP or the like).

Note that a feature quantity calculating module and an estimating model being associated with the above-described control attribute "usage purpose of an application (classification of an application)" may be implemented by the following method.

For example, the estimating block 322 may have functions of the following first and second units. The first unit estimates a sequence of states for time-series data of a communication traffic, based on Hierarchical Hidden Markov Model. The first unit puts together (groups in one group) similar patterns from the sequence of states, regards the patterns as one state, and then extracts a sequence of states. Further, the second unit collates the sequence of states extracted by the first unit with an application characteristic previously stored in a storing unit, and determines, i.e., estimates an application state being associated with the time-series data. Herein, it is assumed that the application state includes a classification of the application and an operation mode.

Alternatively, the estimating block 322 first acquires information (e.g., a feature quantity such as a throughput) of a communication traffic of an analysis target. Herein, regarding the information of the communication traffic, a packet arrival interval (average value) (second) per unit time, an average packet size (average value) (byte) per unit time, the number of packets per unit time, and the like may be already calculated.

The estimating block 322 calculates and removes communication noise from the time-series data of the communication traffic. The estimating block 322 extracts a state sequence from the time-series data of the communication traffic, puts similar patterns together into one state, and performs normalizing processing of the state sequence, based on a hierarchical HMM. Thereafter, the estimating block 322 may collate the normalized state sequence with the previously stored application characteristic, and determine an application state being associated with the time-series data of the communication traffic.

For example, the estimating block 322 may stochastically calculate a variation of a state estimated from a varying waveform (a varying frequency, magnitude of a variation) of the time-series data of the communication traffic, heighten an abstraction level of the time-series data in such a way as to remove an unnecessary varying pattern, and determine a classification of the application, based on the state sequence and the application characteristic.

Furthermore, when the application state described above is determined, a machine-learned estimating model may be used. For example, time-series data of a communication traffic of an application state are analyzed as data for learning, and feature quantities such as a communication cycle, a communication period, a non-communication period, and a maximum throughput are extracted. A sorter (sorting model) for determining an application state by machine-learning, based on training data, a correct answer label of the application state, and data may be generated. Herein, "data" include, for example, at least one of an average value, a variance, a maximum value, a minimum value, and the like of a feature quantity of a communication traffic. An application state may be estimated by use of a learned sorter for a feature quantity extracted from a communication traffic of an estimating target.

Consequently, in estimating an application state from time-series data of a communication traffic, occurrence of an incorrect determination can be suppressed, and estimating accuracy can be improved.

Alternatively, Patent Literature 1 described above may be used as a technique of analyzing traffic data and identifying an application classification.

Other Example Embodiments

Note that the above-described example embodiments are each described as a configuration of hardware, but the present disclosure is not limited thereto. The present disclosure is also capable of achieving any processing by causing a central processing unit (CPU) to execute a computer program.

In the above-described example, a program can be stored by use of various types of non-transitory computer-readable media, and supplied to a computer. The non-transitory computer-readable media include various types of tangible storage media. Examples of non-transitory computer-readable media include a magnetic recording medium (e.g. a flexible disc, a magnetic tape, or a hard disc drive), a magneto-optical recording medium (e.g. a magneto-optical disc), a read only memory (CD-ROM), a CD-R, a CD-R/W, a digital versatile disc (DVD), a semiconductor memory (e.g. a mask ROM, a PROM (programmable ROM), an erasable PROM (EPROM), a flash ROM, and a random access memory (RAM). A program may be supplied to a computer by various types of transitory computer-readable media. Examples of transitory computer-readable media include an electric signal, an optical signal, and an electromagnetic wave. A transitory computer-readable medium can supply a program to a computer via a wired communication path such as an electric wire and an optical fiber, or a wireless communication path.

Note that the present disclosure is not limited to the above-described example embodiments, and various modifications can be suitably made without departing from the spirit thereof. The present disclosure may be implemented by suitably combining the example embodiments.

Some or all of the above-described example embodiments can also be described as, but are not limited to, the following supplementary notes.

(Supplementary Note A1)

An estimating apparatus including:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a calculating unit configured to calculate, with regard to each of two or more of the plurality of types of control attributes, each of the feature quantity groups from the communication traffic by use of the feature quantity calculating unit being associated with each of the control attributes; and an estimating unit configured to estimate an attribute value of each of the two or more control attributes from each of the calculated feature quantity groups.

(Supplementary Note A2)

The estimating apparatus according to Supplementary note A1, wherein each of the plurality of feature quantity calculating units implements processing of calculating the feature quantity group from a measurement section relevant to an associated control attribute in the communication traffic.

(Supplementary Note A3)

The estimating apparatus according to Supplementary note A1 or A2, further including a selecting unit configured to select a part from among the plurality of types of control attributes, wherein the calculating unit calculates the feature quantity group from the communication traffic by use of the feature quantity calculating unit being associated with the selected control attribute, the estimating unit estimates the attribute value of the selected control attribute from the calculated feature quantity group, and the selecting unit further selects an unselected control attribute among the plurality of types of control attributes, based on the estimated attribute value.

(Supplementary Note A4)

The estimating apparatus according to Supplementary note A3, wherein the plurality of types of control attributes are defined by a hierarchical structure having a plurality of hierarchical layers, a differing second control attribute being a low-order hierarchical layer of a first control attribute belongs to each of a plurality of first attribute values that the first control attribute among the plurality of types of control attributes can take, and the selecting unit selects from the plurality of types of control attributes in a sequence of a high order to a low order of the hierarchical structure, and further selects, after the attribute value of the selected control attribute is estimated by the estimating unit, a control attribute belonging to the estimated attribute value.

(Supplementary Note A5)

The estimating apparatus according to Supplementary note A4, wherein the communication traffic is observed at usage of an application, and the hierarchical structure is defined in such a way that the first control attribute indicating a usage purpose of the application belongs to a first hierarchical layer, the second control attribute indicating a providing source of the application differing for each of the usage purposes belongs to a second hierarchical layer being a low order of the first hierarchical layer, and a third control attribute indicating a property of the application differing for each of the providing sources belongs to a third hierarchical layer being a low order of the second hierarchical layer.

(Supplementary Note A6)

The estimating apparatus according to Supplementary note A4 or A5, further including a first storing unit configured to hierarchize and store, based on the hierarchical structure, each of the plurality of feature quantity calculating units as a module, wherein the calculating unit specifies the feature quantity calculating unit being associated with the selected control attribute from within the first storing unit, and calculates the feature quantity group from the communication traffic by use of the specified feature quantity calculating unit.

(Supplementary Note A7)

The estimating apparatus according to any one of Supplementary notes A3 to A6, further including a second storing unit configured to store a plurality of estimating models which are each associated with each of the plurality of types of control attributes and with which the attribute value is estimated from the associated feature quantity group, wherein the estimating unit estimates the attribute value of the selected control attribute from the feature quantity group calculated by use of the feature quantity calculating unit being associated with the selected control attribute, by use of an estimating model being associated with the selected control attribute among the plurality of estimating models.

(Supplementary Note A8)

The estimating apparatus according to Supplementary note A7, further including a learning unit configured to learn a parameter of each of the plurality of estimating models, by use of each of the calculated feature quantity groups calculated by use of each of the plurality of feature quantity calculating units, and a correct answer of the attribute value in a control attribute being associated with each of the feature quantity groups, and store the learned estimating model in the second storing unit.

(Supplementary Note A9)

The estimating apparatus according to Supplementary note A8 dependent on Supplementary note A4, wherein the learning unit hierarchizes the learned estimating model, based on the hierarchical structure, and stores the hierarchized estimating model in the second storing unit.

(Supplementary Note A10)

The estimating apparatus according to Supplementary note A7, wherein each of the plurality of estimating models results from a parameter learned by use of the feature quantity group calculated by use of the feature quantity calculating units having an associated control attribute in common, and a correct answer of the control attribute.

(Supplementary Note B1)

An estimating system including:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a storing unit configured to store a plurality of estimating models which are each associated with each of the plurality of types of control attributes and with which an attribute value of each of the associated control attributes is estimated from the associated feature quantity group, and a correct answer of the attribute value in each of the plurality of types of control attributes;

a first calculating unit configured to calculate, by each of the plurality of feature quantity calculating units, each of the feature quantity groups calculated from the communication traffic of a learning target;

a learning unit configured to learn a parameter of each of the plurality of estimating models by use of each of the calculated feature quantity groups and a correct answer of the attribute value in a control attribute being associated with each of the feature quantity groups, and store the learned estimating model in the storing unit;

a second calculating unit configured to calculate, by use of the feature quantity calculating unit being associated with each control attribute, each of the feature quantity groups from the communication traffic of an estimating target, with regard to each of two or more of the plurality of types of control attributes; and an estimating unit configured to estimate an attribute value of each of the two or more control attributes from each of the calculated feature quantity groups.

(Supplementary Note B2)

The estimating system according to Supplementary note B1, wherein each of the plurality of feature quantity calculating units implements processing of calculating the feature quantity group from a measurement section relevant to an associated control attribute in the communication traffic.

(Supplementary Note C1)

An estimating method including:

by a computer, calculating, by use of two or more, being each associated with each control attribute, of a plurality of feature quantity calculating modules configured to implement processing of calculating a differing feature quantity group for each of a plurality of types of control attributes relating to communication control, each of feature quantity groups for each of the control attributes, from a communication traffic; and estimating an attribute value of each of the two or more control attributes from each of the calculated feature quantity groups.

(Supplementary Note D1)

An estimating program causing a computer to execute:

processing of calculating, by use of two or more, being each associated with each control attribute, of a plurality of feature quantity calculating modules configured to implement processing of calculating a differing feature quantity group for each of a plurality of types of control attributes relating to communication control, each of feature quantity groups for each of the control attributes, from a communication traffic; and processing of estimating an attribute value of each of the two or more control attributes from each of the calculated feature quantity groups.

(Supplementary Note E1)

A learning apparatus including:

a plurality of feature quantity calculating units configured to implement processing of calculating, from a communication traffic, a differing feature quantity group for each of a plurality of types of control attributes relating to communication control, the plurality of feature quantity calculating units being each associated with each of the plurality of types of control attributes;

a storing unit configured to store a plurality of estimating models which are each associated with each of the plurality of types of control attributes and with which an attribute value of each of the associated control attributes is estimated from the associated feature quantity group, and a correct answer of the attribute value in each of the plurality of types of control attributes;

a calculating unit configured to calculate, by use of each of the plurality of feature quantity calculating units, each of the feature quantity groups from the communication traffic; and a learning unit configured to learn a parameter of each of the plurality of estimating models by use of each of the calculated feature quantity groups and a correct answer of the attribute value in a control attribute being associated with each of the feature quantity groups, and store the learned estimating model in the storing unit.

(Supplementary Note E2)

The learning apparatus according to Supplementary note E1, wherein each of the plurality of feature quantity calculating units implements processing of calculating the feature quantity group from a measurement section relevant to an associated control attribute in the communication traffic.

(Supplementary Note E3)

The learning apparatus according to Supplementary note E1 or E2, wherein the plurality of types of control attributes are defined by a hierarchical structure having a plurality of hierarchical layers, and the learning unit hierarchizes the learned estimating model, based on the hierarchical structure, and stores the hierarchized estimating model in the storing unit.

(Supplementary Note F1)

A learning method including:

by a computer, calculating, by use of each of a plurality of feature quantity calculating modules configured to implement processing of calculating a differing feature quantity group for each of a plurality of types of control attributes relating to communication control, each of feature quantity groups for each of the control attributes, from a communication traffic;

learning, by use of each of the calculated feature quantity groups and a correct answer of an attribute value in a control attribute being associated with each of the feature quantity groups, a parameter of each of a plurality of estimating models which are each associated with each of the plurality of types of control attributes and with which an attribute value of each of the associated control attributes is estimated from the associated feature quantity group; and storing the learned estimating model in a storing device.

(Supplementary Note G1)

A learning program causing a computer to execute:

processing of calculating, by use of each of a plurality of feature quantity calculating modules configured to implement processing of calculating a differing feature quantity group for each of a plurality of types of control attributes relating to communication control, each of feature quantity groups for each of the control attributes, from a communication traffic;

processing of learning, by use of each of the calculated feature quantity groups and a correct answer of an attribute value in a control attribute being associated with each of the feature quantity groups, a parameter of each of a plurality of estimating models which are each associated with each of the plurality of types of control attributes and with which an attribute value of each of the associated control attributes is estimated from the associated feature quantity group; and processing of storing the learned estimating model in a storing device.

While the invention of the present application has been described above with reference to the example embodiments, the invention of the present application is not limited by the above description. Various changes that may be understood by a person skilled in the art can be made to a configuration and details of the invention of the present application within the scope of the invention.

This application is based upon and claims the benefit of priority from Japanese Patent Application No. 2018-194254, filed on Oct. 15, 2018, the disclosure of which is incorporated herein in its entirety by reference.

REFERENCE SIGNS LIST

1 ESTIMATING APPARATUS
111 FEATURE QUANTITY CALCULATING UNIT
11n FEATURE QUANTITY CALCULATING UNIT
12 CALCULATING UNIT
13 ESTIMATING UNIT
2 LEARNING APPARATUS
211 FEATURE QUANTITY CALCULATING UNIT
21n FEATURE QUANTITY CALCULATING UNIT
22 STORING UNIT
221 ESTIMATING MODEL
22n ESTIMATING MODEL
231 CORRECT ANSWER
23n CORRECT ANSWER
23 CALCULATING UNIT
24 LEARNING UNIT
3 ESTIMATING SYSTEM
30 ESTIMATING SYSTEM
30a ESTIMATING SYSTEM
30b ESTIMATING SYSTEM
31 STORING UNIT
311 DATA FOR LEARNING
3111 COMMUNICATION TRAFFIC
3112 CORRECT ANSWER DATA
3121 FEATURE QUANTITY CALCULATING MODULE
312n FEATURE QUANTITY CALCULATING MODULE
3131 ESTIMATING MODEL
313n ESTIMATING MODEL
314 ESTIMATING TARGET DATA
3141 COMMUNICATION TRAFFIC
3151 CONTROL ATTRIBUTE
315n CONTROL ATTRIBUTE
3161 ATTRIBUTE VALUE
316p ATTRIBUTE VALUE
317 LEARNING PROGRAM
318 ESTIMATING PROGRAM
32 CONTROL UNIT
321 LEARNING BLOCK
3211 CALCULATING UNIT
3212 LEARNING UNIT
322 ESTIMATING BLOCK
3221 SELECTING UNIT
3222 CALCULATING UNIT
3223 ESTIMATING UNIT
33 MEMORY
34 COMMUNICATION IF UNIT
400 NETWORK SYSTEM
400a NETWORK SYSTEM
400b NETWORK SYSTEM
410 PACKET CAPTURE
420 TRAFFIC ANALYZING APPARATUS
420a TRAFFIC ANALYZING APPARATUS
420b TRAFFIC ANALYZING APPARATUS
430 TERMINAL
440 COMMUNICATION NETWORK
450 NETWORK NODE
460 SERVER

The invention claimed is:

1. An estimating apparatus comprising:
at least one processor and
at least one memory storing a plurality of feature quantity calculating software modules and instructions, and
wherein each of the plurality of feature quantity calculating software modules for implementing processing of calculating, from a communication traffic, each of a plurality of feature quantity groups for each of a plurality of types of control attributes relating to communication control, each of the plurality of feature quantity groups being different for each of a plurality of types of control attributes, the plurality of feature quantity calculating software modules being each associated with each of the plurality of types of control attributes;
wherein the at least one processor configured to execute the instructions to:
calculate, with regard to each of two or more of the plurality of types of control attributes, each of the feature quantity groups from the communication traffic by use of the feature quantity calculating software modules being associated with each of the control attributes; and
estimate an attribute value of each of the two or more control attributes from each of the calculated feature quantity groups, and
wherein the at least one processor further configured to execute the instructions to
select a part from among the plurality of types of control attributes,
calculate the feature quantity group from the communication traffic by use of the feature quantity calculating software modules being associated with the selected control attribute,
estimate the attribute value of the selected control attribute from the calculated feature quantity group, and
further select an unselected control attribute among the plurality of types of control attributes, based on the estimated attribute value.

2. The estimating apparatus according to claim 1, wherein each of the plurality of feature quantity calculating software modules implements processing of calculating the feature quantity group from a measurement section relevant to an associated control attribute in the communication traffic.

3. The estimating apparatus according to claim 1, wherein the plurality of types of control attributes are defined by a hierarchical structure having a plurality of hierarchical layers,
a differing second control attribute being a low-order hierarchical layer of a first control attribute belongs to each of a plurality of first attribute values that the first control attribute among the plurality of types of control attributes can take, and
wherein the at least one processor further configured to execute the instructions to select from the plurality of types of control attributes in a sequence of a high order to a low order of the hierarchical structure, and
further select, after the attribute value of the selected control attribute is estimated by the estimating means, a control attribute belonging to the estimated attribute value.

4. The estimating apparatus according to claim 3, wherein the communication traffic is observed at usage of an application, and
the hierarchical structure is defined in such a way that the first control attribute indicating a usage purpose of the application belongs to a first hierarchical layer,
the second control attribute indicating a providing source of the application differing for each of the usage purposes belongs to a second hierarchical layer being a low order of the first hierarchical layer, and
a third control attribute indicating a property of the application differing for each of the providing sources belongs to a third hierarchical layer being a low order of the second hierarchical layer.

5. The estimating apparatus according to claim 3, further comprising first storage device configured to hierarchize and store, based on the hierarchical structure, each of the plurality of feature quantity calculating software modules,
wherein the at least one processor further configured to execute the instructions to
specify the feature quantity calculating software module being associated with the selected control attribute from within the first storage device, and
calculate the feature quantity group from the communication traffic by use of the specified feature quantity calculating software modules.

6. The estimating apparatus according to claim 3, further comprising second storage device configured to store a plurality of estimating models which are each associated with each of the plurality of types of control attributes and with which the attribute value is estimated from the associated feature quantity group,
wherein the at least one processor further configured to execute the instructions to
estimate the attribute value of the selected control attribute from the feature quantity group calculated by use of the feature quantity calculating software modules being associated with the selected control attribute, by use of an estimating model being associated with the selected control attribute among the plurality of estimating models.

7. The estimating apparatus according to claim 6,
wherein the at least one processor further configured to execute the instructions to
learn a parameter of each of the plurality of estimating models, by use of each of the calculated feature quantity groups calculated by use of each of the plurality of feature quantity calculating software modules, and a correct answer of the attribute value in a control attribute being associated with each of the feature quantity groups, and store the learned estimating model in the second storage device.

8. The estimating apparatus according to claim 7,
wherein the at least one processor further configured to execute the instructions to
hierarchize the learned estimating model, based on the hierarchical structure, and store the hierarchized estimating model in the second storing means.

9. The estimating apparatus according to claim 1, further comprising second storage device configured to store a plurality of estimating models which are each associated with each of the plurality of types of control attributes and with which the attribute value is estimated from the associated feature quantity group,
wherein the at least one processor further configured to execute the instructions to
estimate the attribute value of the selected control attribute from the feature quantity group calculated by use of the feature quantity calculating software modules being associated with the selected control attribute, by use of an estimating model being associated with the selected control attribute among the plurality of estimating models.

10. The estimating apparatus according to claim 9,
wherein the at least one processor further configured to execute the instructions to
learn a parameter of each of the plurality of estimating models, by use of each of the calculated feature quantity groups calculated by use of each of the plurality of feature quantity calculating software modules, and a correct answer of the attribute value in a control attribute being associated with each of the feature quantity groups, and store the learned estimating model in the second storage device.

11. The estimating apparatus according to claim 9, wherein
each of the plurality of estimating models
results from a parameter learned by use of the feature quantity group calculated by use of the feature quantity calculating software modules having an associated control attribute in common, and a correct answer of the control attribute.

12. An estimating method comprising:
by a computer,
calculating, by use of two or more, being each associated with each control attribute, of a plurality of feature quantity calculating software modules configured to implement processing of calculating each of a feature quantity groups for each of a plurality of types of control attributes relating to communication control, each of the plurality of feature quantity groups being different for each of a plurality of types of control attributes, each of feature quantity groups for each of the control attributes, from a communication traffic; and
estimating an attribute value of each of the two or more control attributes from each of the calculated feature quantity groups, and
selecting a part from among the plurality of types of control attributes,
further calculating the feature quantity group from the communication traffic by use of the feature quantity calculating software modules being associated with the selected control attribute, further estimating the attribute value of the selected control attribute from the calculated feature quantity group, and further selecting an unselected control attribute among the plurality of types of control attributes, based on the estimated attribute value.

13. A non-transitory computer-readable medium storing an estimating program causing a computer to execute:

processing of calculating, by use of two or more, being each associated with each control attribute, of a plurality of feature quantity calculating software modules configured to implement processing of calculating each of a feature quantity groups for each of a plurality of types of control attributes relating to communication control, each of the plurality of feature quantity groups being different for each of a plurality of types of control attributes, each of feature quantity groups for each of the control attributes, from a communication traffic; and processing of estimating an attribute value of each of the two or more control attributes from each of the calculated feature quantity groups, and processing of selecting a part from among the plurality of types of control attributes, wherein the processing of calculating calculates the feature quantity group from the communication traffic by use of the feature quantity calculating software modules being associated with the selected control attribute, the processing of estimating estimates the attribute value of the selected control attribute from the calculated feature quantity group, and the processing of selecting selects an unselected control attribute among the plurality of types of control attributes, based on the estimated attribute value.

* * * * *